United States Patent [19]

Nikkel

[11] Patent Number: 4,787,878
[45] Date of Patent: Nov. 29, 1988

[54] HIGH TORQUE CUSHION DRIVE COUPLING

[76] Inventor: Lee F. Nikkel, P.O. Box 117, Madrid, Nebr. 69150

[21] Appl. No.: 889,740

[22] Filed: Jul. 28, 1986

[51] Int. Cl.⁴ .............................................. F16D 3/50
[52] U.S. Cl. ....................................... 464/83; 464/89; 464/152; 464/901
[58] Field of Search ....................... 464/74, 75, 76, 83, 464/85, 89, 147, 150, 152, 180, 901

[56] References Cited

U.S. PATENT DOCUMENTS

| | | | |
|---|---|---|---|
| 247,265 | 9/1881 | Meyrick | 464/75 |
| 1,065,969 | 7/1913 | Rogers | 464/83 |
| 1,840,714 | 1/1932 | Guy | 464/74 |
| 1,864,080 | 6/1932 | Madge | 464/89 X |
| 2,098,703 | 11/1937 | Geyer | 464/89 |
| 2,142,784 | 1/1939 | Guy | 464/89 |
| 2,404,115 | 7/1946 | Williams | 464/89 |
| 3,246,484 | 4/1966 | Haddad et al. | 464/76 X |
| 3,859,821 | 1/1975 | Wallace | 464/89 |
| 4,385,896 | 5/1983 | Borda | 464/76 |
| 4,479,786 | 10/1984 | DeBisschop | 464/89 |
| 4,627,885 | 12/1986 | Arlt | 464/74 X |

FOREIGN PATENT DOCUMENTS

| | | | |
|---|---|---|---|
| 819603 | 11/1951 | Fed. Rep. of Germany | 464/89 |
| 717052 | 10/1954 | United Kingdom | 464/85 |

OTHER PUBLICATIONS

Real Parts U-Joint Brochure (1 sheet) (date unknown).

Primary Examiner—Daniel P. Stodola
Attorney, Agent, or Firm—John A. Beehner

[57] ABSTRACT

A high torque cushion drive coupling has two half sections, each of which includes first and second jaw portions which are respectively bonded to a body of resilient material which fills the space between them.

10 Claims, 2 Drawing Sheets

HIGH TORQUE CUSHION DRIVE COUPLING

BACKGROUND OF THE INVENTION

The present invention is directed generally to a high torque cushioned drive coupling and more specifically to a drive coupling particularly adapted for connecting the drive shafts on a center pivot irrigation tower to the worm gearbox which drives them.

Center pivot irrigation system towers are commonly constructed with a worm gearbox for intermittently driving the support wheels of that tower for advancing a respective section of the water pipe around the center pivot. Because each tower may start and stop every one or two minutes, a rigid coupling is unacceptable because of the repeated shock that would be delivered to the system generally. Accordingly, cushioned drive couplings have been devised wherein a body of rubber or the like is interposed between abutting portions of the coupling to absorb impact from starts and stops.

Known cushioned couplings have several undesirable limitations, however. Some include many parts when in disassembled form, thereby substantially complicating installation and storage of the replacement couplings. More significant is the short service life of known cushioned couplings. Because these couplings are installed adjacent the irrigation tower ground wheels and because they are often exposed to mud and dirt during operation, foreign matter such as sand and dirt tends to enter the cracks between the rubber insert and metal coupling sections and wear out the rubber insert. If a harder rubber is used to resist wear, its cushioning function is comprised. Finally, unitary couplings which slide-fit onto the drive shafts often rust onto the shaft making removal very difficult. An alternate problem of such couplings is that if they become loose, the coupled end of the drive shaft can be worn out.

Accordingly, a primary object of the invention is to provide an improved high torque cushion drive coupling.

Another object is to provide such a coupling having a resilient insert resistant to entry of foreign matter between the insert and adjacent coupling portions.

Another object is to provide such a coupling which can be easily installed onto and removed from a pair of shafts to be coupled.

Another object is to provide such a coupling in the form of two identical half sections adapted to be clamped onto opposite sides of the shafts to be coupled.

Another object is to provide a high torque cushion drive coupling which is simple and rugged in construction, economical to manufacture and efficient in operation.

SUMMARY OF THE INVENTION

The high torque cushion drive coupling of the present invention includes a pair of matched coupling half sections, each half section including first and second jaw portions adapted to cooperate with the respective first and second jaw portions of the other half section to securely receive and hold a pair of first and second drive shafts. The first and second jaw portions of each half section are arranged in longitudinally overlapping spaced-apart relation with a body of resilient material substantially filling the space between the first and second jaw portions. The resilient material is securely bonded to the first and second jaw portions to close and eliminate any cracks therebetween. Accordingly, the problem of wear due to foreign matter between the rubber and metal parts is eliminated.

The coupling is preferably constructed of two identical half sections for simplified installation and parts storage. The split construction of the coupling greatly facilitates removal of any couplings that may become rusted onto a respective drive shaft. The substantial cushioning afforded by the coupling of the invention insulates the irrigation system generally from mechanical shock thereby increasing its useful life and minimizing necessary repairs.

DESCRIPTION OF THE PREFERRED EMBODIMENT

Figure 1:
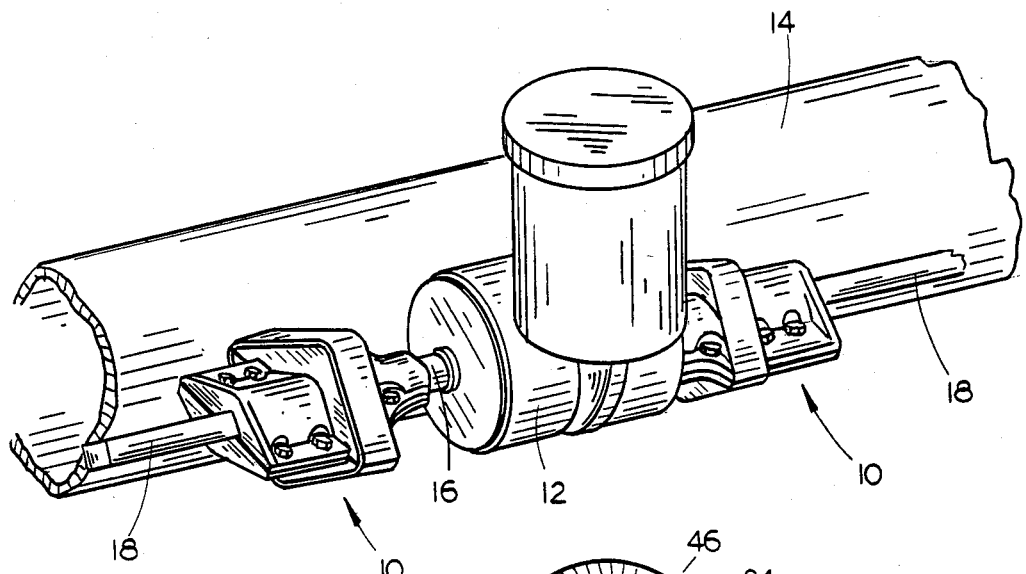
FIG. 1 is a partial perspective view showing a pair of couplers for connecting two drive shafts to opposite ends of an irrigation tower gearbox.

FIG. 1 illustrates a pair of the high torque cushion drive couplings 10 of the present invention in association with the worm gear housing 12 of an irrigation tower constructed of relatively wide diameter tubing such as the 6⅝ inch diameter galvanized tube 14 shown in FIG. 1. The worm gear housing has a pair of one-inch diameter round output shafts 16 to be coupled to a pair of elongated square section drive shafts 18 for driving the tower ground wheels. Each tower requires four couplings 10, two for each drive shaft 18, with two drive shafts per tower.

Each coupling 10 includes a pair of preferably identical coupling half sections 20 which are adapted to be secured together to receive the output shaft 16 in one and the drive shaft 18 in the other end to couple them together for rotation in unison.

Figure 4:
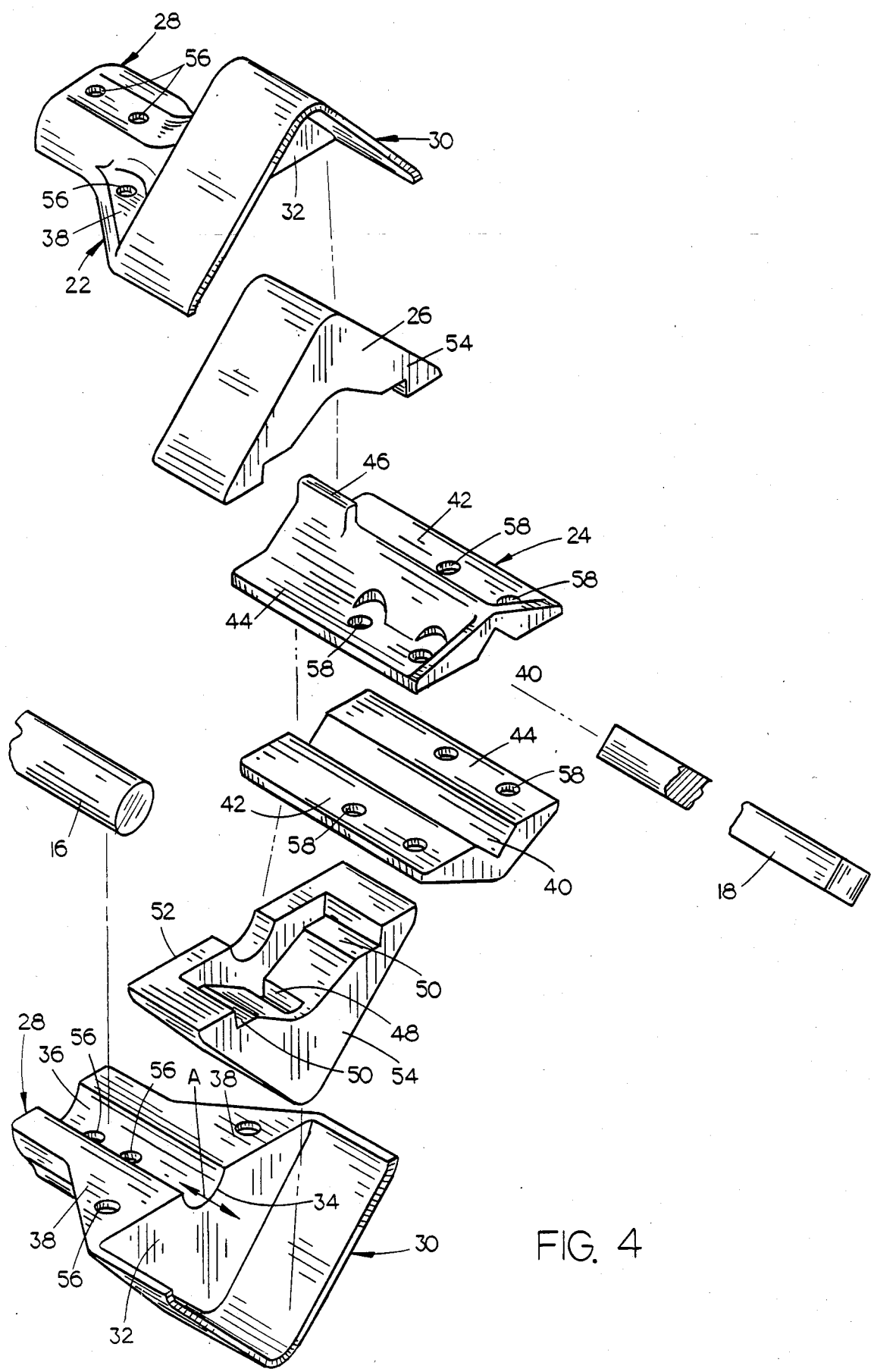
FIG. 4 is an exploded perspective view of the coupling of the invention.

As shown best in the exploded view of FIG. 4, each half section 20 includes a first jaw portion 22, a second jaw portion 24 and a body of resilient material 26 such as natural rubber, interposed between them.

The first jaw portion 22 has outer and inner end portions 28 and 30 respectively, connected together at a transversely extended medial wall 32. In this description, "inner" and "outer" refer to longitudinal directions relatively to the longitudinal center of coupling 10, as indicated by arrow A at the bottom of FIG. 4. "Interior" and "exterior" refer to radial directions relative to the output shaft 16.

Figure 2:
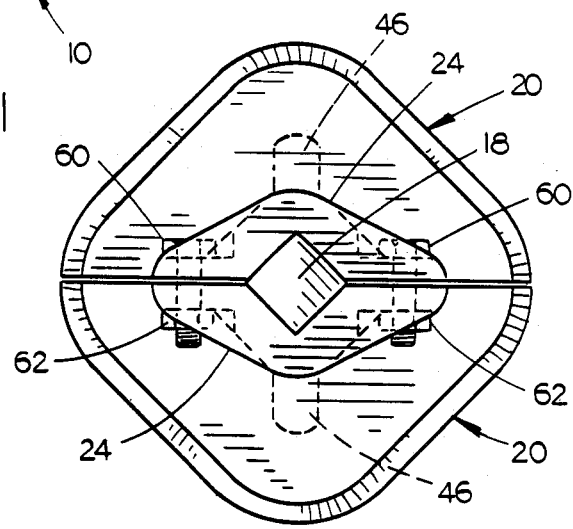
FIG. 2 is an end view of the coupling with hidden structure indicated in dotted lines.

Inner end portion 30 of first jaw portion 22 is shown as a generally round-ended L-shaped plate adapted to register with a like end portion 30 of the other first jaw portion to define a round cornered square enclosure, as shown in FIG. 2. The outer end of the enclosure is closed by the medial walls 32 but for the semi-circular cutout 34 aligned with a generally semi-circular groove 36 extended longitudinally along the interior surface of outer end portion 28. Outer end portion 28 is thus a generally half sleeve having inwardly flaring gussets 38 for connection to the medial wall 32.

The second jaw portion 24 is illustrated as a somewhat half sleeve in that it includes a longitudinally extended V-shaped groove 40 along the interior surface thereof. It further includes opposite exteriorly directed flanges 42 and 44 and a riser 46 coacts with the body of resilient material 26 to axially secure the second jaw portion 24 relative to first jaw portion 22.

The body of resilient material 26 is formed to completely fill the space between the first and second jaw portions 22 and 24 so as to eliminate any gaps in which abrasive foreign matter could be collected. In this regard, the body of resilient material 26 is exteriorly formed to seat within the peripheral wall of inner end portion 30 and is interiorly formed to have the inner end of the second jaw portion 24 nest within it. For example, a recess 48 receives the riser portion 46 and flats 50 have the second jaw portion flanges 42 and 44 engaged thereon.

Figure 3:
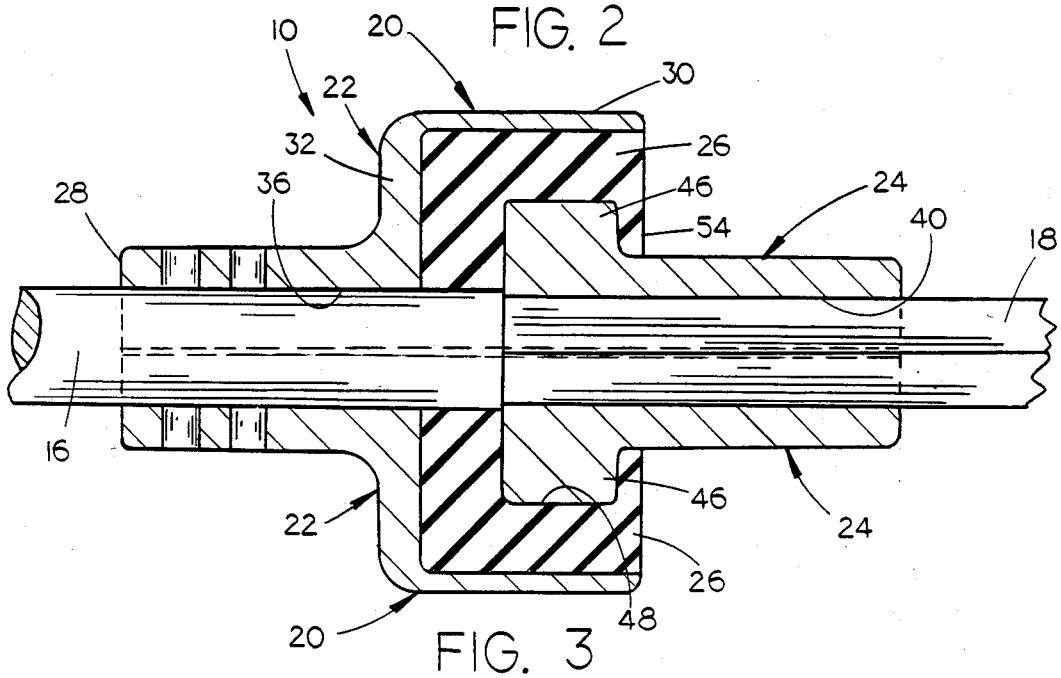
FIG. 3 is a side sectional view of the coupling linking a drive shaft to the output shaft.

To join the first jaw portion 22, second jaw portion 24 and resilient material 26 together to form a unitary half section 20, the body of resilient material 26 is bonded to the first and second jaw portions 22 and 24 over the entire interior and exterior surfaces of the body of resilient material. The medial-wall-adjacent end surface 52 is not bonded to the inner surface of medial wall 32, however, and the opposite end surface 54 remains exposed as shown in FIGS. 2 and 3.

To fasten two half sections 20 together to form an operative coupling, a series of registered bolt holes 56 are provided in each first jaw portion 22 and like bolt holes 58 are provided in the second jaw portions 24. Int he first jaw portion 22, it is preferred that a couple of the bolt holes 56 extend through groove 36 and through registered holes in the output shaft 16 so that the output shaft is fixed against rotation within the first jaw portions 22. In the second jaw portion 24, the bolt holes 58 may be conveniently positioned along the flanges 42 and 44.

In operation, the two half sections 20 are quickly and easily positioned adjacent the worm gear box 12 with the shafts 16 and 18 extend into opposite ends thereof. Bolts 60 are inserted through the registered holes 56 and 58 and nuts 62 (FIG. 2) are secured onto the opposite ends of the bolts to secure the half sections 20 together with the shafts 16 and 18 clamped therebetween.

The entire assembly affords a cushioned torque coupling. Most importantly, the fact that the rubber or other flexible material is bonded directly to both jaw portions of each half section eliminates any possibility of dirt or foreign matter getting in between them to cause wear.

Whereas the invention has been shown and described in connection with a preferred embodiment thereof, it is contemplated that many substitutions, corrections and additions may be made within the intended broad scope of the appended claims. Likewise, whereas the coupling has been described for coupling the round and square drive shafts of an irrigation tower, the same type of coupling will be operative for connecting shafts of any cross-sectional shape in whatever environments they are found.

Thus there has been shown and described an improved high torque cushion drive coupling which accomplishes at least all of the stated objects.

I claim:

1. A high torque cushion drive coupling for drivingly connecting an output shaft to a drive shaft, comprising:
   a pair of separate coupling half sections, each half section including,
      a first jaw portion adapted to cooperate with the first jaw portion of the other half section to secure the output shaft therebetween,
      a second jaw portion adapted to cooperate with the second jaw portion of the other half section to secure the drive shaft therebetween,
      said first and second jaw portions being arranged in longitudinally overlapping radially spaced-apart relation, and
      a body of resilient material substantially filling the space between said first and second jaw portions and being securely bonded to said first and second jaw portions thereby to form a unitary coupling half section, and
   coacting fastener means on said pair of coupling half sections for securing the output shaft to said first jaw portions and the drive shaft to said second jaw portions whereby said output and drive shafts are drivingly coupled for rotation in unison.

2. The coupling of claim 1 wherein said body of resilient material comprises natural rubber.

3. The coupling of claim 1 wherein said first jaw portion comprises longitudinal inner and outer end portions with respect to the longitudinal center of said drive coupling, said outer end portion comprising a generally half sleeve having an elongated channel for partially receiving said output shaft and said inner portion comprising an enlarged peripheral wall portion for at least partially enclosing said body of resilient material.

4. The coupling of claim 3 wherein said second jaw portion comprises an elongated half sleeve member having an elongated channel for partially receiving said drive shaft.

5. The coupling of claim 4 wherein said second jaw portion extends longitudinally within said inner end peripheral wall portion of the first jaw portion and including an exteriorly directed riser disposed within said body of resilient material.

6. The coupling of claim 4 wherein said first jaw portion further comprises a transverse medial wall between said inner and outer end portions, said body of resilient material being in flush engagement against an inner surface of said medial wall.

7. The coupling of claim 1 wherein said pair of coupling half sections are substantially identical.

8. The coupling of claim 1 wherein said coacting fastener means comprises a plurality of aligned bolt holes through the first jaw portions of said pair of coupling half sections.

9. The coupling of claim 1 wherein said first jaw portions are adapted to secure a round output shaft therebetween and said second jaw portions are adapted to secure a square section drive shaft therebetween.

10. The coupling of claim 1 wherein said body of resilient material is bonded to the interior surface of said first jaw portion and to the exterior surface of said second jaw portion.

* * * * *